United States Patent [19]

Camire et al.

[11] Patent Number: 4,985,262

[45] Date of Patent: Jan. 15, 1991

[54] PROCESS FOR PREPARING A SNACK PRODUCT

[75] Inventors: Alexis L. Camire, Flower Mound; Ofomata E. Ejike, Louisville; Kim C. Krumhar, Bedford; Michael V. Taranto, Carrollton, all of Tex.

[73] Assignee: Frito-Lay, Inc., Dallas, Tex.

[21] Appl. No.: 198,555

[22] Filed: May 25, 1988

[51] Int. Cl.$^5$ .............................................. A21D 8/00
[52] U.S. Cl. .................................. 426/302; 426/99; 426/303; 426/305
[58] Field of Search ................ 426/302, 99, 447, 448, 426/449, 304, 303, 305, 309, 293, 294, 296

[56] References Cited

U.S. PATENT DOCUMENTS

| | | | |
|---|---|---|---|
| 3,427,951 | 2/1969 | Mitan et al. | 99/166 |
| 3,532,509 | 10/1970 | Gronberg | 99/83 |
| 3,619,211 | 11/1971 | Chang et al. | 99/140 |
| 3,666,491 | 5/1972 | Touba | 426/99 |
| 3,682,652 | 8/1969 | Corbin et al. | 426/302 |
| 3,687,679 | 8/1972 | Sijbring | 99/1 |
| 3,745,019 | 7/1973 | Huxsoll et al. | 99/83 |
| 3,814,818 | 6/1974 | Chang et al. | 426/65 |
| 3,830,941 | 8/1974 | Luft et al. | 426/99 |
| 3,840,676 | 10/1974 | Yamamoto et al. | 426/89 |
| 3,925,563 | 12/1975 | Staughn et al. | 426/302 |
| 3,959,519 | 5/1976 | Johnson | 426/648 |
| 4,104,406 | 8/1978 | Stringer et al. | 426/99 |
| 4,104,407 | 8/1978 | Stringer et al. | 426/99 |
| 4,124,727 | 11/1978 | Rockland et al. | 426/549 |
| 4,218,487 | 8/1980 | Jaeggi | 426/533 |
| 4,456,624 | 6/1984 | Glantz et al. | 426/96 |
| 4,499,113 | 2/1985 | Mochizuki et al. | 426/291 |
| 4,511,583 | 4/1985 | Olson et al. | 426/89 |
| 4,520,034 | 5/1985 | Ishii et al. | 426/96 |
| 4,765,996 | 8/1988 | Misaki et al. | 426/309 |
| 4,767,636 | 8/1988 | Ramos et al. | 426/291 |
| 4,769,247 | 9/1988 | Rothenberg et al. | 426/291 |
| 4,844,919 | 4/1989 | Szwerc | 426/94 |

OTHER PUBLICATIONS

Matz, Snack Food Technology, Avi Publishing Co., Inc., 1976, pp. 129–135.

Primary Examiner—D. Czaja
Assistant Examiner—Mary S. Mims
Attorney, Agent, or Firm—Bernard, Rothwell & Brown

[57] ABSTRACT

Aqueous liquid, a farinaceous flour and oil are applied to snack-sized, extruded farinaceous collets having an aqueous moisture content within the range of about 5–15 weight percent. The aqueous liquid, flour and oil can be individually applied to the collets, or applied together as a slurry. The coated collets are baked to reduce the aqueous moisture content of the collets to a shelf-stable moisture content of about 2 weight percent of less. Potato-based collets processed in accordance with the present invention have french-fry color and flavor characteristics, desirable non-uniform shapes, and a crispy/crunchy texture.

26 Claims, No Drawings

PROCESS FOR PREPARING A SNACK PRODUCT

BACKGROUND OF THE INVENTION

1. Field of the Invention

The present invention relates to a process for manufacturing extruded farinaceous snack products.

2. DESCRIPTION OF THE BACKGROUND ART

Extruded snack food products, including puffed snack products, are popular consumer items for which there exists a great demand. Puffed snack products are made from a mixture comprised of one or more cereal meals and/or flours, water, oil and other ingredients. The mixture is subjected to high temperature, pressure, and shear in a cooking extruder such that the mixture will "puff" or expand upon reaching atmospheric pressure after extrusion. The extrudate is then cut to form collets and fried or baked to reduce the aqueous moisture content of the collets to about 2 weight percent or less, thereby providing a crisp product that is shelf stable. The collets are usually flavored after baking or frying by being coated with seasoning.

Other popular snack foods, such as potato chips, are produced using raw whole potatoes as a starting material.

Elongate potato "sticks" or "shoestrings" formed from strips of raw, whole potatoes that are fried to a shelf-stabled moisture content also are known in the art, see, e.g., Sijbring U.S. Pat. No. 3,687,679.

Snack products that are produced using raw whole vegetables as a starting material generally are more expensive than extruded snack products due to the high cost of the raw materials and the expense involved in cutting raw vegetables into snack-sized pieces. However, it has heretofore not been possible to produce an extruded snack product having a similar appearance and flavor, color and texture attributes as snack products formed from pieces of raw, whole vegetables.

There remains a need in the art for processes for preparing improved extruded snack products.

SUMMARY OF THE INVENTION

Snack products are prepared in accordance with the present invention by applying an aqueous liquid onto a quantity of snack-sized, extruded farinaceous collets having an initial weight and an aqueous moisture content within the range of about 5–15 weight percent prior to application of the aqueous liquid. A farinaceous flour is applied onto the collets after application of the aqueous liquid, and oil is applied onto the collets after application of the farinaceous flour. It is also possible to combine the water, farinaceous flour and oil (of various melt temperatures) into a slurry which will thicken as the flour takes up moisture and swells. This thick slurry can be sprayed onto the collets prior to baking. The aqueous moisture content of the collets is reduced to about 2 weight percent or less by baking.

DESCRIPTION OF THE PREFERRED EMBODIMENTS

It has surprisingly been discovered that a shelf-stable, extruded snack product can be made from relatively inexpensive base materials, yet have flavor and color attributes of french fry snacks formed from strips of raw potato, along with a crispy/crunchy texture and non-uniform combinations of flavor, color and texture that give the product a home-made appearance.

In accordance with the present invention, snacks are produced from an edible, flowable food material which may be used in an extrusion process, and which is capable of rigidification after extrusion. Preferred flowable materials are made using farinaceous products such as meals, flours, starch-based flakes or granules and the like, or mixtures thereof. Meals, flours or starch-based flake materials include those made from potatoes, corn (including white corn), rice, oats, wheat, legumes, and the like, or mixtures thereof.

Sufficient moisture is mixed with the meal, flour and/or flake material to form an extrudable mixture. The water is added to the mixture prior to introduction into an extruder, after introduction into an extruder, or both. Other ingredients may optionally be added to the mixture to alter the flavor, texture and/or appearance of the product. Leavening agents, such as monocalcium phosphate and/or sodium bicarbonate are preferred optional ingredients for altering the texture of the product.

The extrudable mixture or batter is cooked in a cooking extruder under temperatures and pressures which result in the expansion (puffing) of the mixture upon reaching atmospheric pressure when extruded. Puff extrusion cooking conditions are well known in the art, and generally include temperatures at or above the boiling point of water and pressures from about 1300 to about 2000 pounds per square inch at the outlet of the extruder. The mixture generally has a moisture content prior to extrusion of about 8–25 weight percent. After extrusion of the extrudate through the extruder die, the extrudate is stretched, conditioned and cut into snack-sized collets which, in accordance with the present invention, preferably have elongate rod shapes that are dimensioned like typical french fries.

Although an acceptable product may be produced without dehydrated potato, preferred embodiments incorporate dehydrated potato flakes or granules at levels of at least 1/6 of the dry ingredients present by weight in the collets. In a particularly preferred embodiment, the dry ingredients of the extrusion mixture include about 40 weight percent high density potato flakes, about 30 weight percent white corn meal and about 30 weight percent rice flour, with minor amounts (less than 1% each), of monocalcium phosphate, sodium bicarbonate and annatto.

According to one embodiment, an extruded "rope" of an essentially square cross section and having a width of approximately 0.40–0.45 inch is stretched longitudinally so that the width of each side is reduced to approximately 0.30–0.40 inch. The stretched rope is cooled while traveling over a high velocity air belt for 2–10 seconds before being cut into bite-sized pieces of about 2–4 inches in length and about 0.30–0.40 inches in width. These collets, having an aqueous moisture content within the range of about 5–15 weight percent, are sprayed with a slurry (20–60 weight percent of the initial weight of the collets) comprising 2–4 parts by weight oil, 0.5–2 parts by weight water and 0.5–2 parts by weight of a farinaceous flour while being tumbled, for example, in a rotating seasoning drum of the type typically used to commercially apply seasoning to snacks. Preferably, the slurry comprises about 1 part by weight water, about 1 part by weight potato flour and about 4 parts by weight oil. Spraying of the slurry onto the collets results in a collapse of the surface cell structure of the collets which increases the density of the product and facilitates curving and "wilting" of the collets during subsequent baking thereof, to provide the product with a desirable non-uniform, home-made appearance and crunchy texture.

If desired, antioxidant materials such as TBHQ or BHA/BHT may be added to the slurry to increase the shelf life of the product. Alternatively, natural antioxidant systems composed of combinations of lecithin and tocopherol fractions may be used. Also, flavor enhancers such as the amino acid D, L-Methionine can be added to the slurry.

In preferred embodiments, the slurry comprises liquid partially hydrogenated soybean oil (66 weight percent), fine granulation potato flour (18 weight percent), and water (16 weight percent). Small amounts of emulsifiers (0.1–0.5 weight percent) such as lecithin, monoglycerides diglycerides and mixtures thereof produce a smoother, more easily sprayable slurry in formulations in which potato flour, or other starchy material, comprises 18–25 weight percent of the slurry mixture. Also, flavoring or flavor precursor ingredients may be added to the slurry. The amount of slurry sprayed on the quantity of collets is about 35–50 weight percent of the initial weight of the collets. In manufacturing, for example, for 100 lb/hr of collets exiting the extruder, approximately 80 lb/hr of slurry is applied in a continuous seasoning-type tumbler.

A portion of the oil can be deleted from the slurry and added after baking to control oil flavor development during baking or to use as a carrier for heat-degradable flavors added after baking, as noted below.

The components of the slurry system can be added separately, if desired. For example, the amount of aqueous liquid sprayed onto the collets is about 5–15 weight percent of the initial weight of the collets prior to application of the aqueous liquid. The aqueous liquid sprayed onto the collets may contain a flavor enhancer such as the amino acid D, L-Methionine to promote flavor development of the collets.

After the collets are sprayed with the aqueous liquid, a farinaceous flour is applied onto the collets by dusting. With potato-based collets, potato flour is dusted onto the collets after spraying with aqueous liquid.

Advantageously, the farinaceous flour is dusted onto the wet collets while tumbling the collets in a snack food seasoning drum. The flour is dusted onto the collets generally in amounts within the range of about 5–10 weight percent of the initial weight of the collets. With potato-based collets, the amount of potato flour dusted onto the collets preferably is about 7 weight percent of the initial weight of the collets.

After dusting the collets with flour, oil can be applied onto the collets, preferably as a mist. Advantageously, the oil is sprayed onto the collets at a temperature within the range of about 15°–45° C. (about 60°–110° F.), with the amount of oil sprayed onto the collets equal to about 25–35 weight percent of the initial weight of the collets. If applied as a slurry, the temperature of the slurry needs to be maintained at a temperature less than the gelatinization temperature of the farinaceous flour or approximately in the range of 60°–110° F. to prevent excessive thickening. In particularly preferred embodiments, the slurry is sprayed onto the collets at a temperature of about 80° F. If desired, a portion of the oil normally sprayed onto collets prior to baking, may be applied after baking to make possible the use of heat sensitive flavor systems, reduce the proportion of total product oil exposed to high baking temperatures, and increase shelf life.

After applying oil to the collets, the collets are baked to reduce the aqueous moisture content of the collets to a shelf-stable moisture content of the about 2 weight percent or less. In preferred embodiments, the collets are baked at a temperature within the range of about 120°–205° C. (about 250°–400° F.), most preferably within the range of about 150°–180° C. (about 300°–355° F.).

Extruded potato-based snacks can be produced according to the present invention that possess many of the desirable attributes of french fry snacks made from whole potatoes, yet at a much lower cost.

It is believed that the use of water followed by flour and an oil spray prior to baking, or the use of the slurry combination of oil, water and flour, develops a french fry flavor without frying. Additionally, a characteristic golden brown french fry color is developed during baking by the combination of oil and potato flour which contains reducing sugars to enhance browning.

Application of aqueous liquid to collets already having an aqueous moisture content of about 5–15 weight percent provides desirably non-uniform combinations of bent and curved shapes that result from "wilting" of the collets during baking which has been shown by scanning electron microscopy to be the result of a collapse in the surface cells of the collet.

The invention is further illustrated by the following example, which is not intended to be limiting.

EXAMPLE

A farinaceous mixture containing 42.50 weight percent potato flakes, 28.51 weight percent white corn meal, 28.51 weight percent rice flour, 0.45 weight percent monocalcium phosphate, 0.36 weight percent sodium bicarbonate and 0.01 percent annatto, was mixed until homogeneous.

A slurry was prepared as follows: 52.64 pounds of soybean oil at 95° F. was charged into a high intensity mixer with the mixer turned on. Then, 14.75 pounds of potato flour was dispersed in the oil, after which 13.16 pounds of water at 90° F. was gradually added. The mixer was operated for 1 minute after which the farinaceous slurry was transferred into an agitated feed vessel from where it was metered into a tumbler.

The farinaceous mixture was conveyed to a cooking extruder and the feed rate into the extruder was 400 lb/hr. The extruder screw rpm resulted in a torque of 68% and a die pressure of approximately 1500 psi. Water was introduced into the feed section of the extruder at a rate of 45–46 lb/hr. Upon expansion and exiting the extruder, the collet "rope" was conditioned as it was pulled and stretched from 0.41" to 0.37" diameter by a cutter assembly which cut the extrudate into 2½ inch long collets having a moisture content of about 8–10 weight percent and a bulk density of approximately 3.4–3.6 lb/ft³.

The cut collets were conveyed to a tumbler at a rate of 400 lb/hr at which point they were sprayed with the slurry of oil, water and potato flour at a rate of 320 lb/hr. The tumbler was operated such that the residence time for the collets was about 70 seconds.

The sprayed collets were transferred from the seasoning tumbler to a forced hot air oven and baked at 310°–330° F. for 5 minutes. The resulting product had french fry potato flavor and color characteristics, as well as a desirable crispy/crunchy texture and non-uniform shapes. The present invention provides a french fry analogue with desirable flavor, color and texture characteristics and non-uniform shapes, at a substantially lower cost than "shoe-string" or other french fry potato products formed from strips of raw whole potato.

We claim:

1. A process for preparing a snack product, comprising:
   (a) applying an aqueous liquid, a farinaceous flour and oil onto a quantity of snack-sized, extruded farinaceous collets, the collets having an initial weight an aqueous moisture content within the range of about 5-15 weight percent, wherein the aqueous liquid is applied onto the collets in an amount about equal to 5-15 weight percent of the initial weight of the collets, the farinaceous flour is applied onto the collets in an amount about equal to 5-10 weight percent of the initial weight of the collets and the oil is applied onto the collets in an amount about equal to 25-35 weight percent of the initial weight of the collets; and then
   (b) baking the collets to reduce the aqueous moisture content of the collets to about 2 weight percent or less.

2. The process of claim 1 wherein the aqueous liquid, flour and oil are applied to the collets mixed together as a slurry.

3. A process for preparing a snack product, comprising:
   (a) forming a slurry comprising about 0.5-2 parts by weight aqueous liquid, about 0.5-2 parts of weight farinaceous flour and about 2-4 parts by weight oil;
   (b) applying said slurry onto a quantity of snack-sized, extruded farinaceous collets, the collets having an initial weight and an aqueous moisture content within the range of about 5-15 weight percent, wherein the amount of slurry that is applied onto the quantity of collets is about 35-50 weight percent of the initial weight of the collets; and then
   (c) baking the collets to reduce the aqueous moisture content of the collets to about 2 weight percent or less.

4. The process of claim 3 wherein said slurry comprises about 1 part by weight said aqueous liquid, about 1 part by weight said flour and about 4 parts by weight said oil.

5. A process for preparing a snack product, comprising:
   (a) applying an aqueous liquid onto a quantity of snack-sized, extruded farinaceous collets having an initial weight and an aqueous moisture content within the range of about 5-15 weight percent prior to application of the aqueous liquid;
   (b) applying a farinaceous flour onto the collets after application of said aqueous liquid;
   (c) applying oil onto the collets after application of said farinaceous flour; and
   (d) baking the collets after application of said oil, to reduce the aqueous moisture content of the collets to about 2 weight percent or less.

6. The process of claim 5 wherein the amount of aqueous liquid applied onto said quantity of collets is about 5-20 weight percent of the initial weight of the collets.

7. The process of claim 5 wherein the amount of aqueous liquid applied onto said quantity of collets is about 10-15 weight percent of the initial weight of the collets.

8. The process of claim 5 wherein the collets have an aqueous moisture content of about 10 weight percent prior to application of said aqueous liquid.

9. The process of claim 5 wherein the amount of farinaceous flour applied onto said quantity of collets is about 5-10 weight percent of the initial weight of the collets.

10. The process of claim 5 wherein the amount of farinaceous flour applied onto said quantity of collets is about 7 weight percent of the initial weight of the collets.

11. The process of claim 5 wherein the amount of oil applied onto said quantity of collets is about 20-40 weight percent of the initial weight of the collets.

12. The process of claim 11 wherein the amount of oil applied onto said quantity of collets is about 25-35 weight percent of the initial weight of the collets.

13. The process of claim 11 wherein said oil is applied onto said collets at a temperature within the range of about 15-45 degrees C. (about 60-110 degrees F.).

14. The process of claim 13 wherein said oil is applied onto said collets at a temperature of about 27 degrees C. (about 80 degrees F.).

15. The process of claim 7 wherein said baking is at a temperature within the range of about 120-205 degrees C. (about 250-400 degrees F.).

16. The process of claim 15 wherein said temperature is within the range of about 150-180 degrees C. (about 300-355 degrees F.).

17. The process of claim 2 further including the step of adding an emulsifier to said slurry to control viscosity of said slurry.

18. The process of claim 17 wherein said emulsifier is selected from the group consisting of lecithin, monoglycerides, diglycerides and mixtures thereof.

19. A process for preparing a potato-based snack product, comprising:
   (a) spraying an aqueous liquid onto a quantity of snack-sized, extruded farinaceous collets having a first weight and an aqueous moisture content prior to said spraying within the range of about 5-15 weight percent, wherein at least about 1/6 of dry ingredients present by weight in said collets is potato, and wherein the amount of aqueous liquid sprayed onto said quantity of collets is about 5-20 weight percent of the initial weight of the collets;
   (b) dusting potato flour onto said collets after spraying said aqueous liquid, wherein the amount of potato flour dusted onto said quantity of collets is about 5-10 weight percent of the initial weight of the collets;
   (c) spraying a mist of oil onto the quantity of collets after said dusting with potato flour, in an amount about equal to about 20-40 weight percent of the initial weight of the collets; and
   (d) baking the collets after spraying of said oil, to reduce the aqueous moisture content of the collets to about 2 weight percent or less.

20. The process of claim 19 wherein the amount of aqueous liquid sprayed onto the quantity of collets is about 10-15 weight percent of the initial weight of the collets.

21. The process of claim 19 wherein the amount of potato flour dusted onto said quantity of collets is about 7 weight percent of the initial weight of the collets.

22. The process of claim 19 wherein the oil is at a temperature within the range of about 15-45 degrees C. (about 60-110 degrees F.).

23. The process of claim 22 wherein the amount of oil sprayed onto said quantity of collets is equal to about 25-35 weight percent of the initial weight of the collets.

24. The process of claim 23 wherein the oil is sprayed onto the collets at a temperature of about 27 degrees C. (about 80 degrees F.).

25. The process of claim 19 wherein the collets are baked at a temperature within the range of about: 120-205 degrees C. (about 250-400 degrees F.)

26. The process of claim 25 wherein the collets are baked at a temperature within the range of about 150-180 degrees C. (about 300-355 degrees F.).

* * * * *

UNITED STATES PATENT AND TRADEMARK OFFICE
CERTIFICATE OF CORRECTION

PATENT NO. : 4,985,262

DATED : January 15, 1991

INVENTOR(S) : Alexis L. Camire; Ofomata E. Eijike; Kim C. Krumhar and Michael V. Taranto It is certified that error appears in the above-identified patent and that said Letters Patent is hereby corrected as shown below:

Column 5, line 12, before "an" insert --and--.

Signed and Sealed this

Twentieth Day of October, 1992

Attest:

DOUGLAS B. COMER

Attesting Officer

Acting Commissioner of Patents and Trademarks